(No Model.)
T. J. PORTER.
DRAFT AND DUST EXCLUDER.
No. 392,065. Patented Oct. 30, 1888.
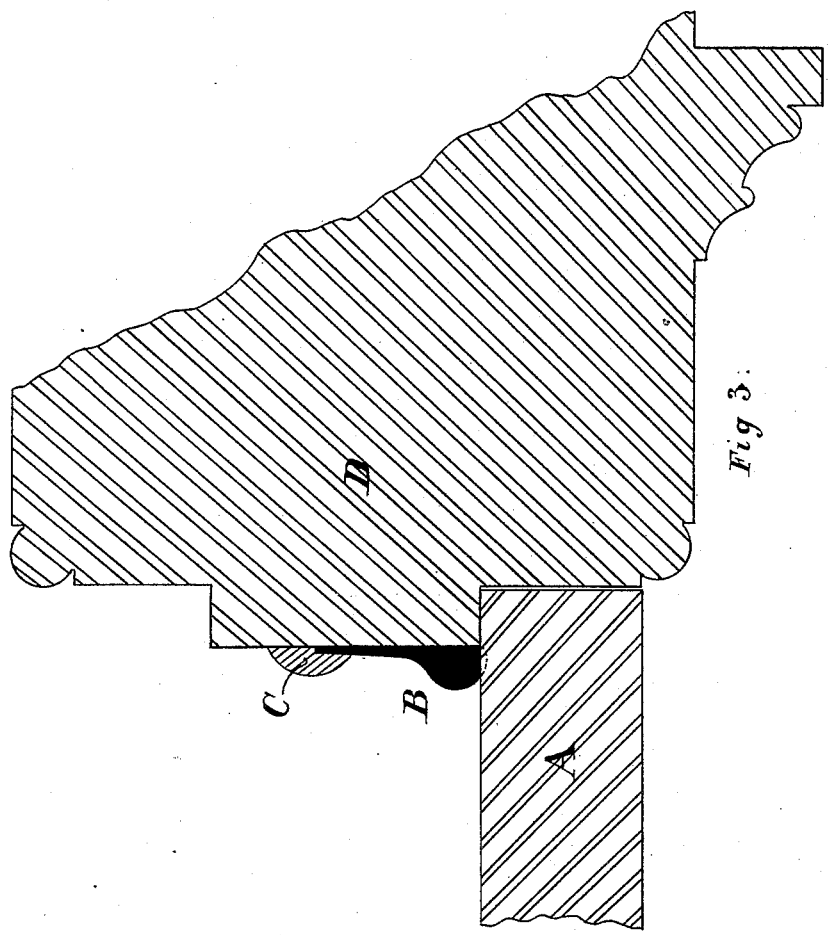
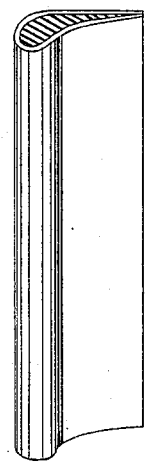
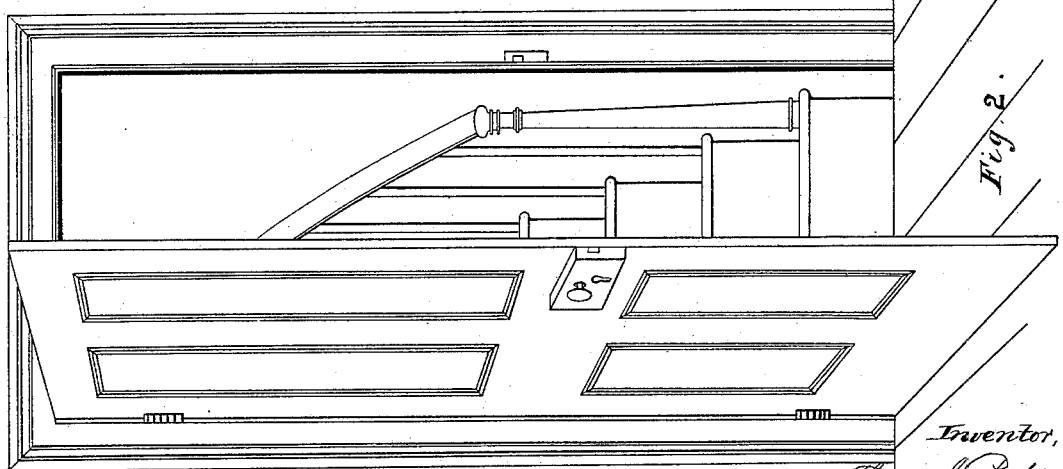
Attest:
W. E. Poulter
E. W. Fallaher
Inventor,
Thomas J. Porter,
per Henry Orth
his atty.

UNITED STATES PATENT OFFICE.

THOMAS JAMES PORTER, OF FLEETWOOD, COUNTY OF LANCASTER, ENGLAND.

DRAFT AND DUST EXCLUDER.

SPECIFICATION forming part of Letters Patent No. 392,065, dated October 30, 1888.

Application filed April 20, 1887. Serial No. 235,531. (No model.) Patented in England April 9, 1886, No. 4,962.

*To all whom it may concern:*

Be it known that I, THOMAS JAMES PORTER, a subject of the Queen of England, residing at Fleetwood, in the county of Lancaster, England, publisher, have invented certain new and useful Improvements in Draft and Dust Excluders, (for which Letters Patent have been obtained in Great Britain, No. 4,962, dated April 9, 1886,) of which the following is a specification.

The principle of this invention is described in the specification to the above British Letters Patent; and it consists in molding a composition into a suitable form and incasing it in a covering of felt, baize, cloth, caoutchouc, paper, or any other similar material or substance, but preferably felt, in which form it can be readily fixed to door-posts, door-casings, or doors, and to window-casings or window-sashes, and then pressed and formed into a long narrow matrix or counterpart of that portion of either door-posts, door-casings, doors, or window-casings or window-sashes to which it is not fixed, but with which it comes in contact when the doors or windows are closed, fitting closely and effectually preventing the passage of draft or dust between doors and their casings or posts and window-sashes and their casings. The composition used possesses the property of changing from a rigid set condition to that of a plastic one on the application of heat or moisture, or both, and of again returning to its rigid set condition on the withdrawal of the heat or moisture, or both, so that the draft and dust excluder may, on being fixed in position while the composition is in a plastic condition, readily take the necessary impress or shape given to it to form the matrix and maintain that impress or shape by reason of the composition afterward setting to a rigid condition, thus forming a permanent matrix.

Figure 1 is a full-sized drawing of a portion of my improved draft and dust excluder, the section at the end showing the formation. Fig. 2 represents an open door, the thick line round the doorway showing the position in which the draft and dust excluder is intended to be placed. Fig. 3 represents a full-sized cross-section upon the horizontal plane of the door A, the door-post D, and the draft and dust excluder B, showing the correct position in which the draft and dust excluder should be attached to door-posts.

C is a light molding fastened down over the edge of the draft and dust excluder by way of finish, but is not absolutely necessary.

The draft and dust excluder is applied to window-casings or window-sashes in the same way as to door-posts, door-casings, or doors.

The composition may be of any suitable materials which will give it the peculiar properties hereinbefore stated; but I have found a mixture of glue, four parts; resin, one part; whiting, four parts; glycerine, one part; water, six parts, all by weight, to give the desired result; and it is preferably mixed as follows: The glue is melted in water and heated at the same time. When hot, the glycerine is added. The whiting may be added before or after the resin, which is melted in a separate pan and poured into the composition when the latter is very hot. If not hot enough, it will not take up the resin. The mass must be well stirred and kept at boiling-point until it thickens to a consistency about equal to that of treacle, when it is run into molds, forming small blocks, and allowed to cool. It is melted again for introduction into the casing or envelope when making the excluders.

I claim—

The described mode of forming draft-excluders or weather-strips, which consists, first, in inclosing in a flexible envelope a composition that becomes plastic when heated or heated and moistened and rigid upon cooling; second, applying the inclosed composition to the parts to be protected, and, third, molding the composition while plastic to the configuration of the parts to which it is applied, substantially as and for the purposes specified.

In testimony whereof I have hereunto set my hand in the presence of the two subscribing witnesses.

THOMAS JAMES PORTER.

Witnesses:
 THOMAS COPELAND,
 AR. SYD. BADGER.